United States Patent [19]

Waite et al.

[11] Patent Number: 5,337,877
[45] Date of Patent: Aug. 16, 1994

[54] COIN VALIDATORS

[75] Inventors: Timothy P. Waite, Escher Surrey; Richard D. Allan, Reading Berkshire, both of United Kingdom

[73] Assignee: Mars, Inc., McLean, Va.

[21] Appl. No.: 923,860

[22] Filed: Jul. 31, 1992

Related U.S. Application Data

[63] Continuation-in-part of Ser. No. 828,809, Feb. 27, 1992, abandoned.

[30] Foreign Application Priority Data

Jul. 28, 1989 [GB] United Kingdom ............. 8917258.9

[51] Int. Cl.$^5$ ............................................. G07D 5/08
[52] U.S. Cl. ......................................... 194/317; 194/335
[58] Field of Search ............... 194/317, 318, 319, 334, 194/335

[56] References Cited

U.S. PATENT DOCUMENTS

| | | | |
|---|---|---|---|
| 4,660,705 | 4/1987 | Kai et al. | 194/334 X |
| 4,971,187 | 11/1990 | Furuya et al. | 194/318 |
| 5,002,174 | 3/1991 | Yoshihara | 194/317 |
| 5,158,166 | 10/1992 | Barson | 194/317 X |

FOREIGN PATENT DOCUMENTS

| | | |
|---|---|---|
| 0146251 | 6/1985 | European Pat. Off. . |
| 0203702 | 12/1986 | European Pat. Off. ............ 194/317 |
| 0213283 | 3/1987 | European Pat. Off. . |
| 2646025 | 4/1978 | Fed. Rep. of Germany ...... 194/317 |
| 57-24803 | 2/1982 | Japan . |
| 62-164190 | 7/1987 | Japan . |
| 8600410 | 1/1986 | PCT Int'l Appl. . |
| 2207270 | 1/1989 | United Kingdom . |

Primary Examiner—Michael S. Huppert
Assistant Examiner—Scott L. Lowe
Attorney, Agent, or Firm—Davis Hoxie Faithfull & Hapgood

[57] ABSTRACT

A coin validator has a thickness sensor formed by two coils positioned one on each side of the coin path. The coil outputs are processed separately to derive values which, when combined, produce a thickness-indicating measurement which is independent of coin position. Each output may be processed to give values which are linearly dependent upon coin position with the same constant of proportionality. Alternatively, one output is scaled relative to the other to an extent dependent upon the thickness for which the coin is to be tested, so that the thickness-indicating measurement does not vary significantly over a region which corresponds to a likely maximum variation in the position of coins of that thickness.

16 Claims, 4 Drawing Sheets

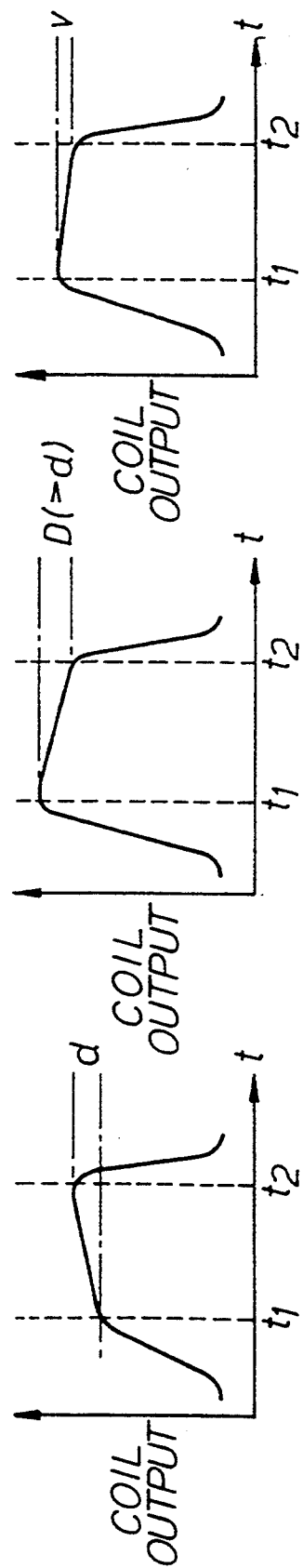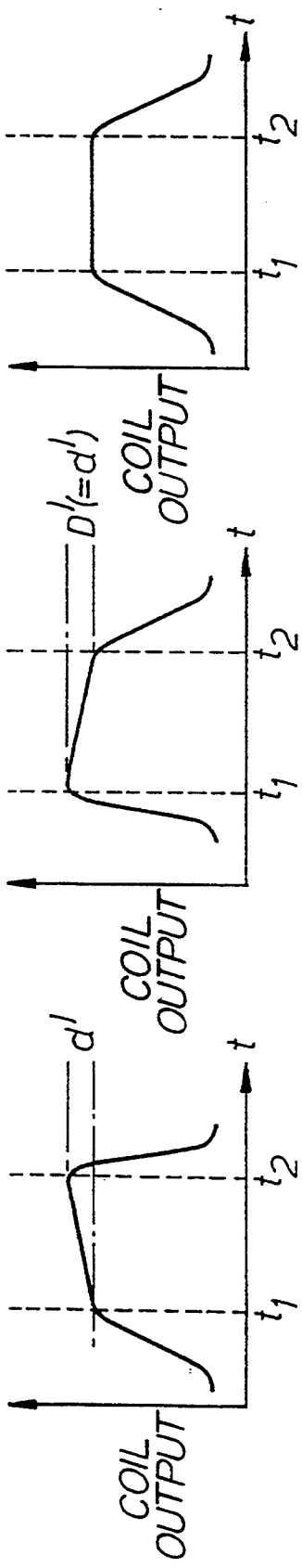
FIG. 4(A)  FIG. 4(B)  FIG. 4(C)
FIG. 4(D)  FIG. 4(E)  FIG. 4(F)

1

COIN VALIDATORS

This is a continuation-in-part of application Ser. No. 07/828,809 filed on Feb. 27, 1992, now abandoned.

FIELD OF THE INVENTION

This invention relates to coin validators, and is particularly concerned with coin thickness sensors for such validators.

BACKGROUND

It is well known to provide a coin validator which has a coin sensor for testing coins by subjecting them to an electromagnetic field and determining the effect of the coin on the field, for example, by measuring the change in the amplitude and/or frequency of the sensor output. Some sensors are used to produce a result which is predominantly dependent upon the coin thickness. The sensor output will also be influenced by other factors, but this does not affect the ability of the sensor to distinguish between coins of different types and therefore other such influences will be ignored for the purposes of the present specification.

A thickness sensor may consist of a coil driven at a relatively high frequency and positioned at one side of the coin path. As the coin passes, it travels along a ramp which is so inclined that the coin face tends to lie against a reference plane as the coin passes the sensor. The coil is located on the other side of the passageway, and its field will be influenced to an extent depending on the location of the coin's closest face with respect to the coil, which in turn will depend on coin thickness. However, in spite of the inclination of the ramp, the coin flight tends to be fairly unstable and therefore errors are encountered due to the possible variations in the coin position with respect to the coil.

In order to mitigate such problems, some thickness sensors are formed with two coils connected together in series or parallel. A first one of the coils is close to the reference plane and the other is at the opposite side of the passageway. For a coin of a particular thickness, any reduction in the effect of the coin on the first coil's field caused by the coin being spaced away from the reference plane is substantially compensated by an increase in the effect of the coin on the other coil's field. However, this is only effective for variations close to a so-called "balance point", and therefore such improvements tend to apply only to a fairly small range of coin thicknesses, and a small range of coin positions with respect to the reference plane.

Attempts have been made to stabilise the coin flight, using for example snubbers for absorbing the coins' kinetic energy, but the problem still remains. Furthermore, it is becoming more desirable to reduce the size of coin validators, and this tends to increase the coin flight instability in that it reduces the distance in which the coins' flight might be stabilized prior to reaching the sensors.

SUMMARY OF THE INVENTION

According to the present invention there is provided a method for testing coins for thickness using inductances positioned on respective sides of a coin path, characterised in that the method comprises producing separate values each indicative of the effect of the coin on an electromagnetic field as detected by a respective one of the inductances, processing at least one of said values, and combining the values as processed so as to obtain a thickness-indicating measurement substantially independent of coin position.

By separating the measurements of the effects detected by the respective inductances, it is possible to take into account the displacement of the coin from each of the respective inductances, and thus provide a combined measurement which is independent of such displacements. This reduces the variability of the thickness measurement and thus enables the use of more stringent testing criteria, so that non-genuine coins are more readily rejected.

Preferably, the processing is such that the values which are combined alter substantially in proportion to changes in the position of the coin between the inductances with substantially the same constant of proportionality, at least over a small range which corresponds to the expected maximum variation in the coin position.

If the relationship between changes in sensor output values and changes in position differs between the sensors, this may be compensated for by appropriate scaling of one or both of the sensor output values. The processing could be achieved by using a look-up table storing predetermined processed values correlated with possible sensor output values. Alternatively, the processing could be achieved by using an appropriate algorithm to operate upon the sensor output values, in which case it may be possible to perform the processing and combining steps simultaneously using a single algorithm.

In one embodiment, the output processing effectively linearises the response curves of the sensors, so that the combination of the processed outputs gives a thickness measurement which is substantially independent of the position of the coin between the sensors.

In another embodiment the relative scaling of the sensor outputs varies in such a way as to alter the effective position of the balance point. When checking to determine whether a coin has a thickness corresponding to a particular denomination, the scaling is adjusted to bring the balance point for coins of the appropriate thickness close to the expected position of the coin. If therefore the coin is of correct thickness, minor variations in coin position will be compensated and thus not significantly alter the thickness measurement.

It is common for a sensor output value to be derived from the signal produced by the sensor when the influence of the coin is at a peak. Such a technique could be used in the present invention for separately deriving each of the sensor output values. However, although this would still permit thickness measurements which are less influenced by coin position than in prior art arrangements, errors may occur due to the position of the coin changing during the time that it passes the sensors, or due to the possibility of the coin travelling in an inclined orientation as it passes the sensors. In either of these situations, each sensor output value will be indicative of the closest position of the coin in the interval while it is passing the sensor. The combined values will thus produce a thickness measurement which is too high.

A preferred aspect of the invention is intended to eliminate or mitigate the effects of this further source of measurement error. According to this preferred aspect, both sensor output values are indicative of the effect of the coin on the sensors at substantially the same time. This time preferably occurs during a period in which the combined output values are at a peak. For example, successive sensor output values may be processed and combined, and the peak of the successive combined values used as the thickness-indicating measurement. Alternatively, to reduce the amount of processing required, the thickness measurement may be derived from both sensor output values produced when the influence on one of the sensors reaches a peak, or alternatively at a predetermined time after the sensors start to be influenced by the arrival of the coin.

The invention also extends to apparatus for validating coins, the apparatus using a method according to the invention.

BRIEF DESCRIPTION OF THE DRAWINGS

An arrangement embodying the invention will now be described by way of example, with reference to the accompanying drawings, in which:

FIGS. 4A–4F illustrate the effect of changes in coin position on the thickness measurement, and indicates how this can be mitigated.

DETAILED DESCRIPTION

Figure 1:
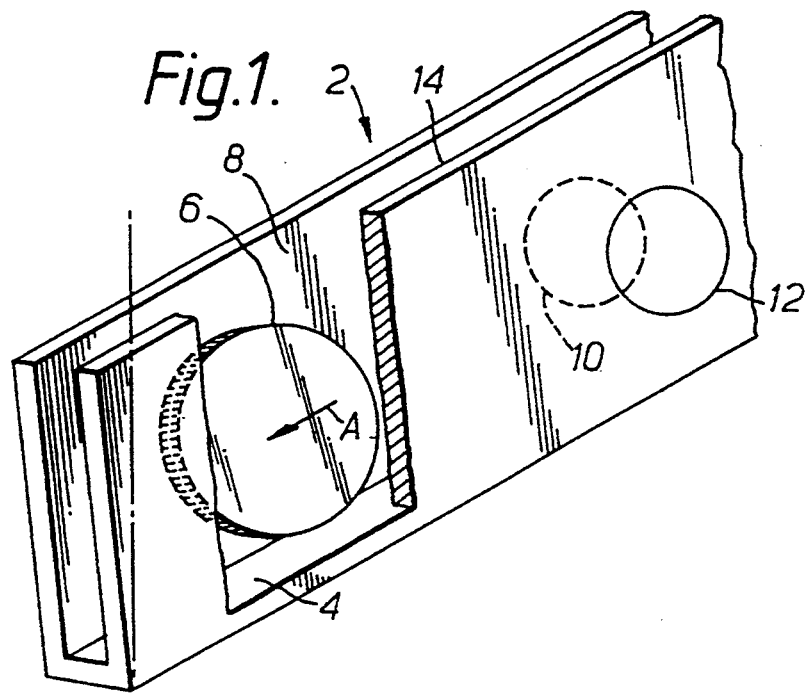
FIG. 1 schematically illustrates a coin passageway of a coin validator in accordance with the invention.

With reference to FIG. 1, a coin passageway 2 includes a ramp 4 which is inclined in a first plane to the horizontal so that a coin such as that indicated at 6 will slide or roll in the direction of arrow A down the ramp. The ramp is also inclined to the horizontal in a perpendicular plane, so that the coins will tend to move with their faces in contact with one side wall 8 of the passageway, which thus acts as a reference plane.

The validator also has a pair of inductance sensors formed by coils 10 and 12. The coil 10 is positioned adjacent to and just behind the reference plane formed by side wall 8. The coil is covered by a membrane (not shown) which is flush with the side wall. This separates the coil from the reference plane by a predetermined distance equal to the thickness of the membrane.

The coil 12 is similarly mounted on the other side of the passageway, spaced by a respective membrane from the inner surface of a side wall 14 opposed to the side wall 8. Both coils are thus accurately positioned with respect to the side walls, and therefore with respect to the possible range of positions across the coin passageway which can be adopted by a coin.

This general type of structure is known in itself. An example is disclosed in European Patent Specification No. EP-A-O 146 251, in which the coils are connected in series. In the present embodiment, however, the coils are not interconnected, and have separate outputs.

Figure 2:
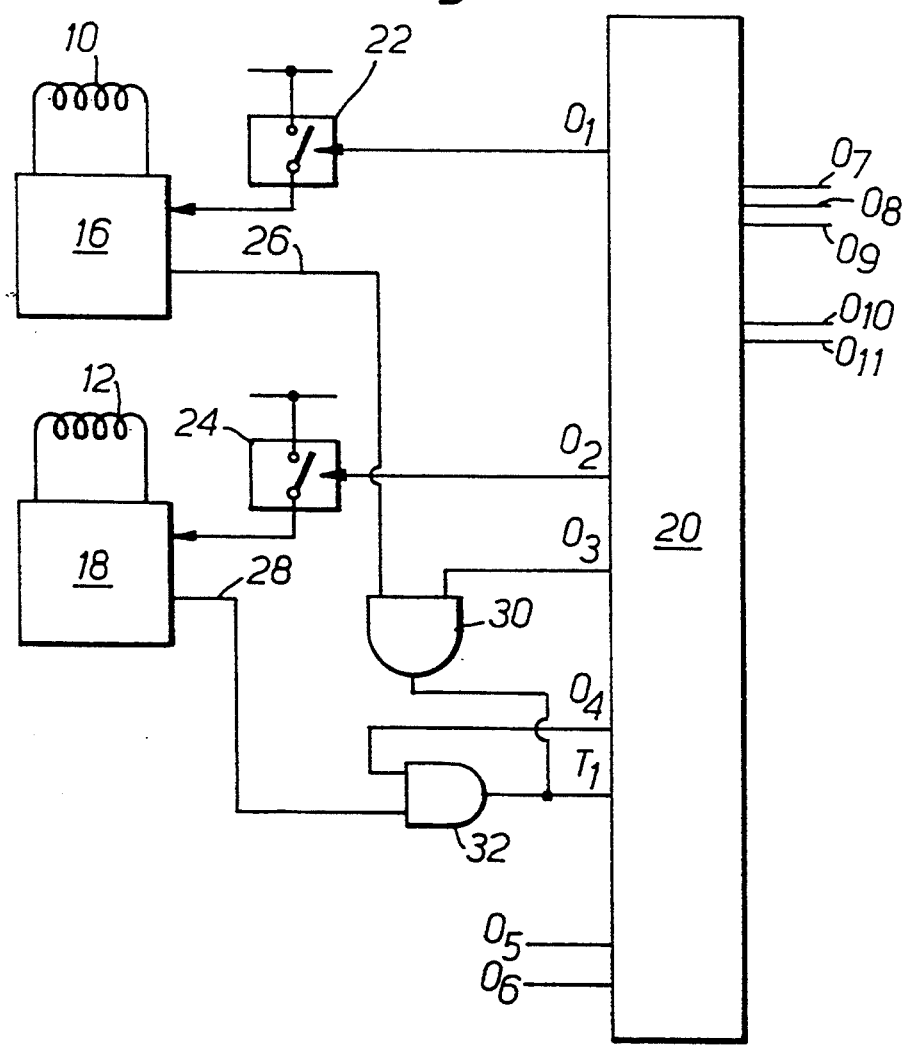
FIG. 2 is a schematic diagram of the relevant parts of the circuit of the coin validator.

As shown in FIG. 2, each of the coils 10 and 12 is connected into a respective oscillator circuit 16 or 18.

The validator has a microprocessor 20 (e.g. selected from the Motorola 6805 family) which has input/output lines 01 to 011, and a timer/counter input terminal T1.

The oscillators 16 and 18 can be turned on and off by switches 22 and 24, respectively, which are controlled by the microprocessor output terminals 01 and 02, respectively. When switched on, each oscillator operates at a relatively high frequency, e.g. 1.0 MHz. The frequencies are preferably high, so that the fields do not substantially penetrate the coins and the effects of the coins therefore are not substantially influenced by their material composition. Outputs carrying signals at the sensor frequencies (or scaled versions thereof) appear on lines 26 and 28, respectively. Pulses on these lines can be delivered to the terminal T1 by closing gates 30 and 32, respectively, which gates are under the control of signals appearing on input/output lines 03 and 04, respectively.

It will be appreciated that the microprocessor can thus turn on either of the oscillators 16 and 18, and close the respective gates 30 or 32 for a predetermined time period during which sensor output pulses appearing at terminal T1 can be counted by an internal counter of the microprocessor to provide a measure of sensor frequency.

In the absence of the coin, the microprocessor repeatedly turns on the oscillator 16 for a brief period and checks the output frequency. If successive frequency readings change by a certain amount, it is determined that a coin has started to enter the field generated by the coil 10. In this way, coin arrival is detected and used to power up various other parts of the validator circuitry, in a manner which is known per se. From that time, the microprocessor 20 repeatedly enables and disables the oscillators 16 and 18 in an alternating fashion so as to take successive readings from each coil. Coil readings may be taken at regular intervals, or in pairs, with a greater interval between successive pairs than between the individual readings of each pair.

After the coin 6 has left the coils 10 and 12, the microprocessor ceases to power up the oscillator 18, except that one or a few further measurements may be taken from each of the coils to establish idle values, i.e. frequency measurements in the absence of a coin. The coil values which are used in the deduction of a thickness measurement are derived from the relationship between the sensed frequencies during the passage of the coin and the idle frequencies (e.g. the difference between or ratio of the frequencies). This technique, which is known per se, reduces the effects of drift of circuit component values, temperature changes, etc. If desired, the idle values can be taken when a further sensor (not shown) detects the presence of a coin, to ensure that the idle values are measured after the coin has completely left the region of the coils 10 and 12.

In the particular arrangement described, because the idle frequencies are measured after the coin leaves the coil, the actual thickness detection operation which takes place while the coin is passing may be based on the idle levels detected following passage of the preceding coin. Obviously, this could be avoided by monitoring the idle values before the coin reaches the coil e.g. by alternately switching on the oscillators for very brief periods.

By operating the coils in succession, rather than simultaneously, it is ensured that there is no cross-talk between the coil outputs, and power consumption is reduced. However, it is not essential to adopt this technique. Cross-talk could be avoided by using coils of high Q, by making the oscillator frequencies substantially different from each other, or by other means. In addition, in some configurations the presence of the coin itself would sufficiently isolate the fields, so that the coils may be driven simultaneously at least while the coin is present.

Figure 3A:
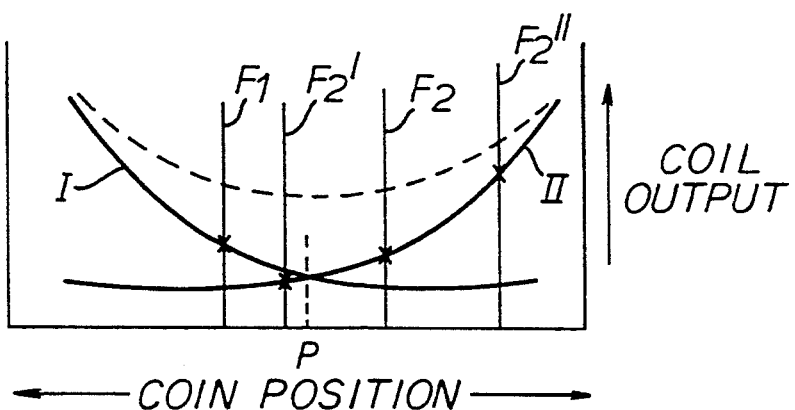
FIGS. 3(A)–3(C) illustrate the advantageous results achieved by an embodiment of the invention in rendering the thickness measurement independent of coin position.

FIG. 3(A) illustrates typical coil outputs for a coin of given thickness. The horizontal axis represents the positioning of the coin across the width of the passageway. The vertical axis represents on an arbitrary scale the maximum difference between the coil output frequency and the idle frequency as the coin passes the coil. Line I represents the output for coil 10, and line II the output for coil 12. The broken line represents (on a different scale) the combined outputs which would be obtained if the coils were connected in series or in parallel. It will be observed that the combined output varies substantially depending upon coin position.

For any given coil arrangement there will be a position P, referred to as the balance point, at which the response curves of the two outputs have substantially equal and opposite gradients when a coin is positioned with its central plane on this point. As is clear from FIG. 3(A), with a coin positioned so that its faces F1 and F2 are equidistant from the balance point, the curve I indicating the response of sensor 10 to face F1 has a gradient equal and opposite to the curve II indicating the response of curve II to face F2. For coils producing fields of equal strength, the balance point P for all coins will be mid-way between the coils. The combined outputs of the coils will not vary substantially so long as the coin is positioned at or close to the balance point P. As indicated above, the location of a coin as it passes the coils is governed by the position of the reference plane (i.e. the size of the membrane separating the coil 10 from the side wall 8) and the thickness of the coin itself. Therefore, for a given coin thickness, such that the plane mid-way between the coin faces is close to the balance point P, it is possible to achieve reasonably accurate results irrespective of small variations in the positioning of the coin. However, coins of smaller thickness will then travel with their faces (F2') located closer to the side wall 8, and coins of larger thickness will be travelling with their faces (F2'') spaced from the side wall 8 by a greater distance. The gradient of the response curve II will be different for the faces F2' and F2'' than the gradient of the response curve I for the opposite face. Therefore, the thickness measurements for these coins will be more variable as a result of small displacements in coin positions. (It is to be noted that FIG. 3(A) represents a particular example in which the coil field strengths are equal and the balance point is located at the position at which the coil outputs are equal. These are not essential requirements.)

Figure 3B:
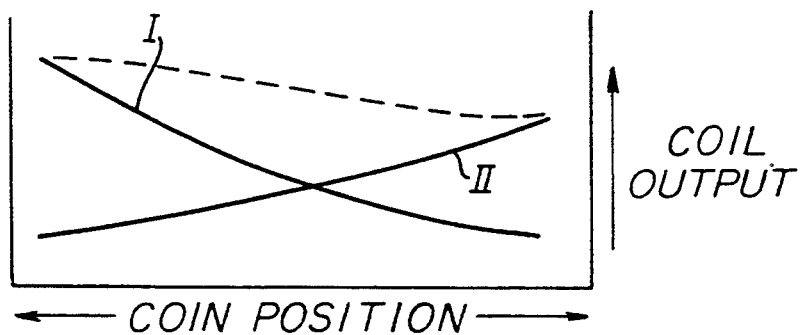

FIG. 3(B) is similar to FIG. 3(A), but in this case the coils have been carefully designed and positioned so that their responses do not vary substantially from linear responses. Although there is some inaccuracy in the combined measurements due to the slight non-linearity of the responses, there is a greater inaccuracy due to the fact that the gradients of the response curves are different. Although it may be possible by careful designing and positioning of the coils to obtain response curves which are reasonably linear or reasonably symmetrical, achieving both these results for all possible coin positions and thicknesses has not proved possible.

Figure 3C:
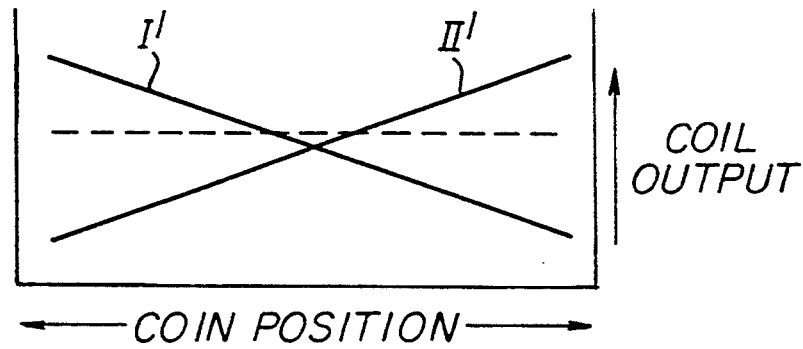

In the present embodiment, the microprocessor 20 takes each of the frequency shift measurements from each coil or sensor, and processes it so as to avoid such problems. In particular, the microprocessor has a read-only memory (not shown) storing a set of processed values, each of which corresponds to a respective coil output value. The coil output value is used to determine the address in the table from which the processed value is to be retrieved. FIG. 3(C) illustrates how the processed values I' and II' vary with coin position. It will be observed that the response curves are linear and symmetrical, and therefore when the processed values are combined by the microprocessor 20, the resulting response shown in broken lines in FIG. 3(C) is substantially independent of coin position.

The values stored in the look-up table are preferably determined experimentally, and may be deduced individually for each validator so as to take into account possible tolerance variations and thereby effectively to calibrate each mechanism. If both coil response curves are substantially non-linear, as in FIG. 3(A), it is desirable for both sets of coil output values to be processed to render them linear. However, if the coil output responses are substantially linear as shown in FIG. 3(B), it may be necessary to process the output of only one coil in order to scale the output to correspond with that of the other sensor. In any event, the processing should result in substantially linear response curves with substantially the same gradient or constant of proportionality, as shown in FIG. 3(C).

In use of the apparatus, the microprocessor 20 converts each coil output value to a processed value using the look-up table, and combines pairs of output values from the respective coil to produce a single combined value which is representative of detected thickness. The microprocessor 20 may be arranged to evaluate the following expression:

$$f\left(\frac{\text{Coil 1 Output}}{\text{Coil 1 Idle}} - 1\right) + f\left(\frac{\text{Coil 2 Output}}{\text{Coil 2 Idle}} - 1\right)$$

using the look-up table, where f(x) represents the result of processing a value x derived from a coil measurement. As the coin enters the region between the coils, the coil outputs will increase to a maximum, then stay at this maximum level as the coin passes the coils, and then decrease to an idling level as the coin leaves the sensors. The value of the expression while the coin is fully within the sensor region represents the sum of the separations between the coils and the adjacent coin face, which is equal to the fixed distance separating the two coils minus the coin thickness. Accordingly this value represents the thickness measurement, and is compared with stored data representing upper and lower window limits for respective coin denominations.

Instead of using a look-up table containing values corresponding to all coil outputs, it is possible to convert the coil outputs using an algorithm, or to use a look-up table for particular coil outputs and then use interpolation for other coil outputs.

FIGS. 4A–4F illustrate how the present embodiment avoids not merely the problems resulting from an indeterminate position of the coin as it passes the coil, but also problems caused by variations in that position during the period in which it is passing the coils. The graphs (A) to (F) of FIG. 4 have vertical axes representing sensor outputs on an arbitrary scale, and horizontal axes representing time. The coin enters the region between the coils in the period leading up to time t1, fully overlaps the coils in the period between t1 and t2, and then after t2 starts to depart from the coils.

FIGS. 4A–4F illustrate the situation where the coin is relatively close to the coil 12 when it enters the region between the coils, but is substantially midway between the coils by the time it leaves the region. Thus, in FIG. 4A, which represents the output of coil 10, it will be observed that during the period t1 to t2, the coil output increases by an amount d. Similarly, in FIG. 4B which represents the output of the coil 12, this output decreases in the period t1 to t2 by an amount D. D is greater than d, because of the non-linearity of the response curves which make changes in the position of the coin affect the nearest coil greater than they affect the furthest coil. Accordingly, if these unprocessed values were to be combined, the result would be as shown in FIG. 4(C), which is analogous to the result obtained in the prior art arrangements where the coils were connected in series or parallel. In FIG. 4(C), it will be observed that the combined output varies between periods t1 and t2 by an amount v. Although this is smaller than either D or d, it is still a significant variance. The variance represents the uncertainty in the measurement due to the uncertainty in the lateral position of the coin.

FIGS. 4(D) and 4(E) represent the processed outputs of coils 10 and 12, respectively. Because these processed outputs are linear, the variation d' in the period t1 to t2 in the processed output of coil 10 is equal and opposite to the variation D' in the processed output of coil 12. Thus, when the outputs are combined, a horizontal peak value as shown in FIG. 4(F) providing an accurate measurement of thickness is obtained. This illustrates that the measurement is unaffected either by coin position or variations in the position.

Similar effects occur if the coin is travelling in an inclined orientation along the ramp 4.

As mentioned above, instead of deriving the peak of the combined values as shown in FIG. 4(F), it would be possible to perform the processing and combining only at a single time point, which could be determined either by a peak in the unprocessed output of one of the coils 10 and 12, or at a predetermined time after arrival of the coin has been sensed. It will be appreciated from FIG. 4 why it is preferred that the combined processed values represent coil outputs at a substantially identical time. In particular, if each of the coils was individually peak-detected, then the output of coil 10 at time t2 would be combined with the output of coil 12 at time t1. The coin would, however, have moved during this interval, and therefore a false reading of thickness would be produced. This situation can, however, be tolerated if the coin flight is sufficiently stabilised that variations in the coin position during this interval are likely to be very small.

Figure 5A:
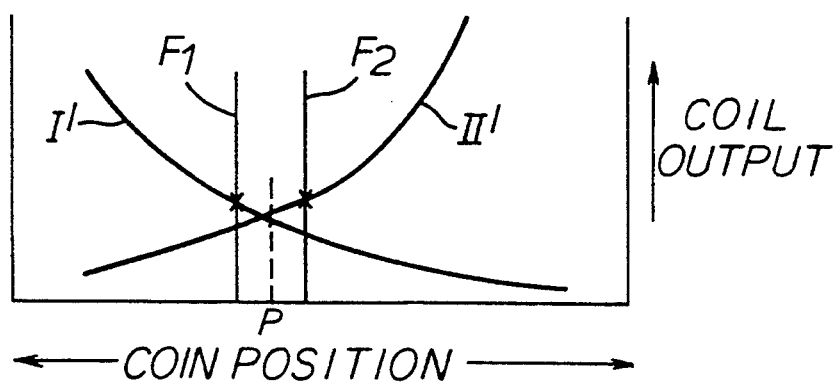
FIG. 5(A) and 5(B) illustrate the operation of a modification of the above embodiment.

A modification of the embodiment described above avoids the need to linearise the outputs of the coils. This modification will be described with reference to FIGS. 5(A) and 5(B). According to this modification, in order to determine whether the coil outputs represent a coin thickness corresponding to that of coins of a particular denomination, at least one and preferably both of the coil outputs are multiplied by respective scaling factors which are associated with that coin denomination. Thus, the microprocessor 20 in this embodiment may be arranged to perform the following evaluation:

$$\left( \text{Scaling Factor 1} \times \left( \frac{\text{Coil 1 Peak}}{\text{Coil 1 Idle}} - 1 \right) \right) +$$

-continued
$$\left( \text{Scaling Factor 2} \times \left( \frac{\text{Coil 2 Peak}}{\text{Coil 2 Idle}} - 1 \right) \right)$$

wherein scaling factor 1 and scaling factor 2 are stored numbers associated with a particular coin denomination A. The result of this evaluation is then compared with stored data defining a range of permissible values for coins of denomination A. If the result falls within this range, then the coin is deemed to have a thickness associated with coin denomination A. Otherwise, a further evaluation is carried out using different stored scaling factors 1 and 2 for another coin denomination.

Figure 5B:
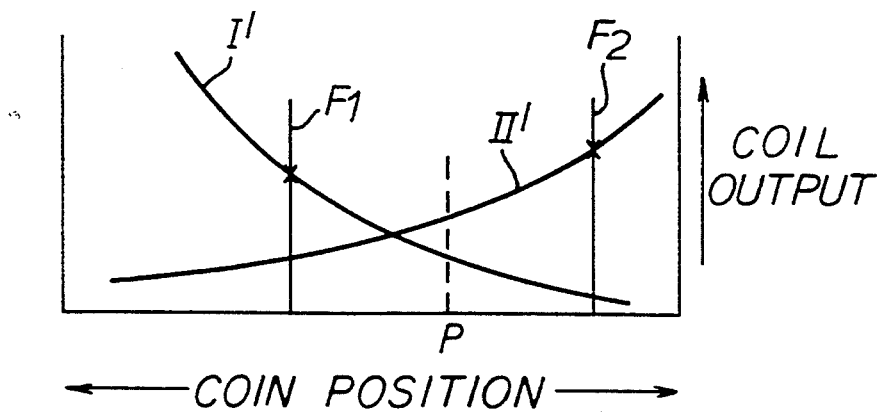

The scaling factors effectively adjust the relative magnitudes of the response curves of the two coils, and thereby alter the balance point P mentioned above. Referring to FIG. 5 (A), the scaling factors may for example adjust the response curves to the form shown at I' and II'. This will shift the balance point, i.e. the position at which a coin of given thickness will produce coil responses which are substantially linear over a relatively small region and have gradients of equal and opposite magnitudes. The illustrated example brings the balance point for thin coins closer to the side wall 8 and therefore makes the outputs suitable for validating such coins. As indicated in FIG. 5(B), other scaling factors can have the effect of making the coil outputs suitable for validating thick coins.

In practice, it is preferable for the balance point to be set at a position spaced from the side wall 8 by a distance slightly greater than half the coin thickness, so that the likely range of coin positions encountered in practice is centered on the balance point.

Although it is preferred that separate sets of scaling factors 1 and 2 be stored for each of the coin denominations to be tested, it may be possible instead to store a smaller number of scaling factors, some of which are suitable for more than one coin denomination.

In this embodiment, it is preferred to use the technique mentioned above whereby the unprocessed output of one of the coils is checked to determine when a peak occurs, and the outputs of both coils are read at or close to that time for use in the thickness measurement evaluation.

The embodiments described above derive measurements by detecting shifts in the frequency of an oscillator. However, the measurements may alternatively be based on absolute frequency values, amplitudes, amplitude shifts, phase shifts, etc.

In the above embodiments the sensor coils are also used to generate the electromagnetic fields which are influenced by the coins. However, this is not essential, as other field-generating means may be used.

The term "coin" has been used herein to cover not only genuine coins but also non-genuine coins, tokens or other items which might be received by a validator.

We claim:

1. A method of testing coins for thickness utilizing first and second inductors positioned on respective sides of a coin path, comprising: 'producing separate first and second inductor output values each indicative of the effects of a coin on an electromagnetic field as detected by the respective one of the first and second inductors, each said inductor output values depending upon the position of the coin across the width of the coin path relative to the respective said inductor, the dependency of the first inductor output value upon coin position differing from the dependency of said second inductor output value upon coin position within at least a limited range of coin positions; and processing at least the first inductor output value and combining the inductor output values so as to generate a thickness indicating signal, the processing of the first inductor output value being different to that, if any, of the second inductor output value so as to substantially compensate said thickness indicating signal for the effects of the dependency difference between the first and second inductor output values.

2. A method as claimed in claim 1, in which the dependence of at least the first inductor output value upon coin position is non-linear, and wherein the processing of said first inductor output value is such as to generate a first processed inductor output value which has a linear gradient of dependence upon coin position, said processed first inductor output value being combined with a further value derived from said second inductor which has substantially the same gradient of dependence upon coin position.

3. A method as claimed in claim 1, wherein the processing is achieved using a look-up table which correlates output values with processed values.

4. A method as claimed in claim 1, wherein the processing results in a scaling of one of the inductor output values with respect to the other to produce a pair of combinable values which alter substantially in proportion to changes in the position of the coin between the inductors with substantially the same constant of proportionally, at least over a region which corresponds to a likely maximum variation in the position of a coin of a particular denomination.

5. A method as claimed in claim 4, the method including the step of testing a coin to determine whether its thickness corresponds to any one of a plurality of different thicknesses each associated with a respective coin denomination, and applying different scaling factors depending on the thickness for which the coin is being tested.

6. A method as claimed in claim 1, wherein the inductor output values are representative of said coin effects detected at substantially the same instant.

7. A method as claimed in claim 6, including the step of successively combining processed values, and peak-detecting the results in order to obtain the thickness-indicating signal.

8. A method as claimed in claim 6, including the step of using the output values of one of the inductors to determine a time when a peak in the output values has occurred, and processing and combining the inductor output values which were produced by said inductors substantially at said time.

9. A method as claimed in claim 1, including the step of producing the first and second inductor output values of the inductors in succession as the coin passes the inductors.

10. A method as claimed in claim 1, including the step of using a single one of the inductors to detect arrival of a coin in a coin validator, and the further step of powering-up predetermined portions of the coin validator in response to said detection.

11. A method as claimed in claim 1, further comprising the steps of digitizing said first and second inductor output values, and processing the first and second inductor output values, using stored data, for balancing the dependence of contributions made by the first and second inductor output values to the thickness indicating signal for a plurality of positions between the inductors.

12. Coin validation apparatus comprising:

means defining a path for conveying a coin travelling in edge-first orientation, said path being sufficiently wide to permit the coin to adopt different positions in a direction transverse to the direction of the path;

first and second inductors positions on respective sides of the path, the first and second inductors being operable to sense changes in an electromagnetic field caused by the passage of the coin between the inductors and to supply respective first and second inductor output values indicative of said changes, there being a gradient difference between the gradients of the respective dependencies of the first and second inductor output values upon the position of a coin within said path relative to the inductors; and processor means for accepting the inductor output values and for performing a conversion process in which at least the first output value is modified, and for producing a thickness indicating signal from a combination of the inductor output values, the conversion process modifying the first inductor output value differently than the modification, if any, of the second inductor output value to substantially compensate said thickness indicating signal for the gradient difference.

13. Apparatus as claimed in claim 12, wherein said conversion process is arranged such that the inductor output values which are combined are substantially linearly dependent upon the position of the coin between said inductances, with substantially the same constant of proportionality.

14. Apparatus as claimed in claim 12, wherein said conversion process is operable to cause a scaling of one of the inductor output values with respect to the other.

15. Apparatus as claimed in claim 12, wherein said processor means is operable to test the inductor output values caused by a passing coin to determine whether its thickness corresponds to any one of the plurality of different thicknesses each associated with a respective coin denomination, and wherein said processor means is operable to perform said conversion process such that different scaling factors are applied to at least one of the inductor output values depending upon the thickness of which the coin is being tested.

16. Coin validator apparatus comprising:

means for defining a path for conveying a coin travelling in edge first orientation, said path being sufficiently wide to permit the coin to adopt different positions in a direction transverse to the direction of the path;

first and second inductors positioned on respective sides of the path, the first and second inductors being operable to sense changes in the electromagnetic field caused by the passage of the coin between the inductors and to supply respective first and second inductor output values indicative of said changes;

store means for storing a plurality of different linear weighting data values;

scaling means for receiving the first and second inductor output values and for generating therefrom a plurality of linearly weighted sum values corresponding to the sum of the first inductor output value multiplied by a first stored weighting value and the second inductor output value multiplied by a second stored weighting value; and windowing means for testing each of said linearly weighted sum values against the respective acceptance window.

* * * * *

UNITED STATES PATENT AND TRADEMARK OFFICE
CERTIFICATE OF CORRECTION

PATENT NO.   : 5,337,877

DATED        : August 16, 1994

INVENTOR(S)  : Waite et al.

It is certified that error appears in the above-identified patent and that said Letters Patent is hereby corrected as shown below:

Claim 15, col. 10, line 44, after "to any one of" delete "the" and insert --a--.

Claim 16, col 12, line 1, after "values against" delete "the" and insert --a--.

Signed and Sealed this

Twenty-third Day of September, 1997

Attest:

BRUCE LEHMAN

Attesting Officer

Commissioner of Patents and Trademarks